United States Patent Office 3,719,775
Patented Mar. 6, 1973

3,719,775
IMAGE PICKUP SYSTEM BY LINEARLY
RADIATED LASER LIGHT
Takashi Takaoka, Kawasaki, Sadao Takahashi, Tokyo,
Takeo Fukuda, Kawasaki, and Teruhisa Hori, Tokyo,
Japan, assignors to Tokyo Shibaura Electric Co., Ltd.,
Kawasaki-shi, Japan
Filed Mar. 2, 1970, Ser. No. 15,810
Claims priority, application Japan, Mar. 1, 1969,
44/15,584
Int. Cl. H04n 5/84
U.S. Cl. 178—6.7 R                                      13 Claims

ABSTRACT OF THE DISCLOSURE

An image pickup system installed in a movable body which transversely scans the image of a foreground object in a direction perpendicular to that in which said body travels, using a pulsed linear laser light beam advancing parallel to said traveling direction, thereby obtaining in said movable body the two-dimensional image of said object and information on the undulations thereof.

---

The present invention relates to an image pickup system for obtaining the two-dimensional image of a foreground object and information on the undulations thereof by transverse scanning using a linearly radiated laser light.

Where the condition of the ground surface is observed and data thereon are recorded by an airplane, photographic means using an ordinary camera has heretofore been widely adopted. This means utilizes illumination by natural light and has been barred from use when the space is dark as at night time.

Since the development of a laser light, however, there has been proposed a laser camera which is capable of photographing even in the dark if a laser light is applied thereto. Such camera is described as a new type of radar device using laser light in a publication entitled "Aviation Week and Space Technology," dated Apr. 26, 1965.

The prior art laser camera was operated by emitting continuously oscillated narrow beams of light from a laser device, for example, to scan the ground surface from an airplane and obtain information thereon from the intensity of received reflected beams of light corresponding to the particular configurations of the ground surface.

Since, however, the laser light has a single color, the resultant photograph presents far less information than that obtained by natural light. This is a drawback where there are to be prepared reconnaissance pictures.

For elimination of this drawback, it may be contemplated to devise a system involving a plurality of laser oscillators generating waves of different lengths so as to increase the amount of information. However, such a system will unavoidably grow too bulky to be practically installed in an airplane.

Figure 1:
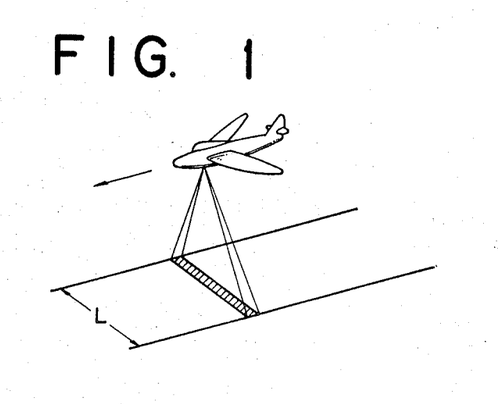
FIG. 1 illustrates the prior art image pickup system using a linear laser light.

In an attempt to overcome these shortcomings, there has been proposed a device illustrated in FIG. 1 which radiates narrow beams of linear laser light to the ground surface in a direction perpendicular to that in which an airplane travels and scans the ground surface by said beams as it moves on so as to obtain ample information. However, if, with this device, the linear laser light was to be radiated to the ground by increasing the width L of its radiation coverage which extended in a direction perpendicular to that in which an airplane traveled, then the light-receiving means would require a large number of light-receiving elements, also adding to the bulkiness of said device as a whole. Further, if the width L of said coverage of radiation was enlarged with the number of light-receiving elements fixed, the angular resolving power was reduced. Accordingly, there would occur the drawback that the range of the ground surface to be radiated by laser light had to be limited.

With any of the prior art laser light systems, a laser light was transmitted to the ground in a continuously oscillated form and in consequence the reflected light was also received continuously. Accordingly, there was recorded a laser light reflected not only from the target ground object, but also from minute particles floating in the atmosphere, unavoidably deteriorating the quality of photographs obtained. It has been contemplated to use a pulsative laser light to eliminate these drawbacks. However, in case the pulsative laser is used, until a laser pulse reflected on the surface of the ground is received, the next laser pulse can not be radiated. Then, the repetition time of the pulse laser radiation can not be reduced more than the time corresponding to the distance between the airplane and the surface of the ground. Accordingly, if the beam-like pulse laser is employed in a pulsative form, there will be still greater difficulties in effecting scanning over a broad range per unit time. As a result, a substantial increase in the amount of information can not be obtained.

In order to increase the information quantity, the linearly radiated laser light must be used and not the beam-like laser light.

In view of the above description, there is demanded for such type of a laser light system as oscillates in the pulsative form a linear laser light, other than the prior art linear laser light expanding in the direction perpendicular to that in which the airplane flies.

The object of the present invention is to provide a pickup system for picking up the image of a foreground object distinctly and quickly over a broad range without the necessity of using a bulky device.

SUMMARY OF THE INVENTION

The present invention provides an image pickup system installed a body movable relative to an object. The system comprises means including a laser oscillator for generating a beam-like laser light in the form of pulses, an optical system for converting said beam-like pulse laser light into a long linear laser light advancing parallel to the direction of relative movement between the body and object, means for transversely scanning the object by said linear laser light pulses in a direction perpendicular to the direction of relative movement between the body and the object, and means for receiving light reflected from the object and obtaining a two-dimensional image thereof from the intensity of said reflected light. Further, information relating to the three-dimensional condition of said foreground object can be obtained from the difference between the time of radiating the laser and that of receiving it.

This invention can be more fully understood from the following description when taken with reference to the accompanying drawings, in which.

Figure 2:
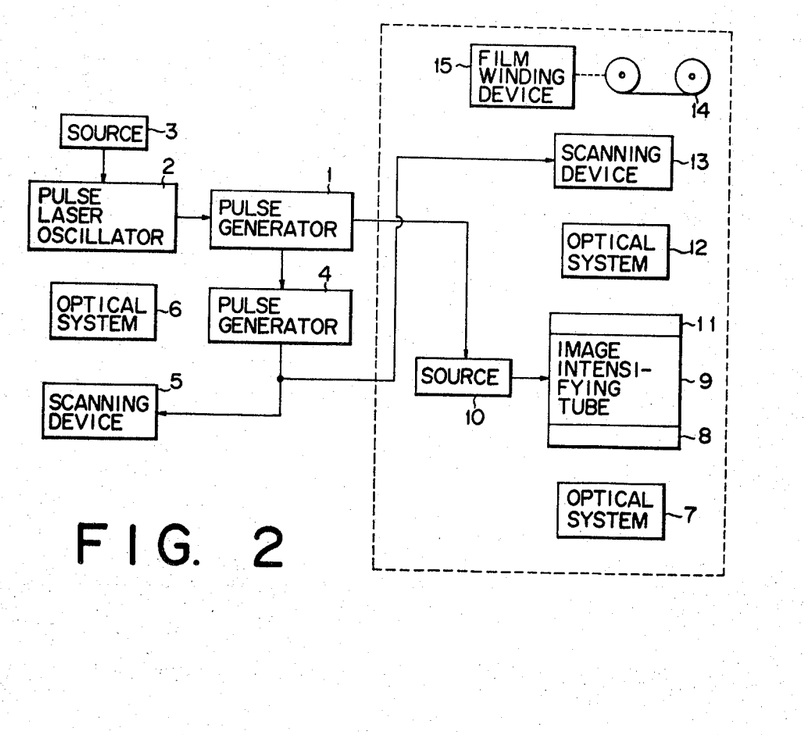
FIG. 2 is a block diagram according to an embodiment of the present invention for obtaining the two-dimensional image of a foreground object.
Figure 3A:
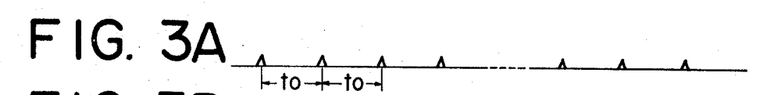
FIG. 3 is a time chart illustrating the operation of the system of the invention.
Figures 3B, 3C, 3D:
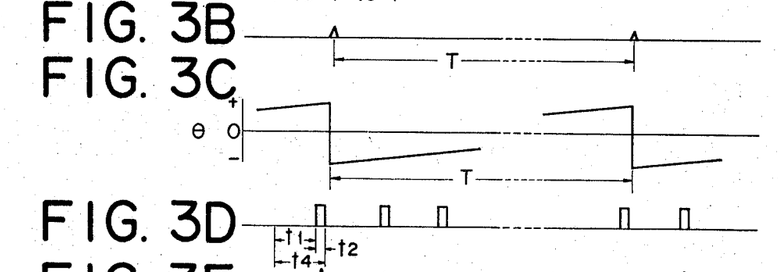

The will now be described the image pickup system of the present invention by reference to FIGS. 2 to 13 wherein the system is installed in an airplane. Referring to FIG. 2, there are generated from a pulse generator 1 pulses having a period $t_0$ used as a reference for the timing of image pickup in the manner indicated in the timing chart of FIG. 3A. The pulse generator 1 is connected to a pulse laser oscillator provided with a source 3 to generate laser pulses having a period $t_0$ from said oscillator 2. Here, the period $t_0$ is so set as to be greater than the time which the laser pulse takes in traveling both ways through a maximum radiating range Hmax. allowed for the pickup device, namely, 2Hmax./$C_L$ (where: $C_L$=velocity of laser light). Output pulses from a second pulse generator 4 are made to synchronize with those from the first pulse generator 1 to have a period $Nt_0$ (where: N=an integer) illustrated in FIG. 3B, and conducted to a first scanning device 5. A first optical system 6 transforms an output laser light from the pulse laser oscillator 2 into the type for transverse scanning which has a capacity of resolving the desired angle $\phi'$ with respect to a direction perpendicular to that in which an airplane 21 shown in FIG. 4A travels and defines an angle $\phi$ with respect to the direction in which said airplane 21 travels and carries out radiation over a desired radiated line area 22 advancing in the airplane-traveling direction. Said linear laser light for transverse scanning scans the ground surface at an angle of $2\theta$ (vertical angle $\theta=0$) as shown in FIGS. 3C and 4B under control of the first scanning device 5.

Figure 5:
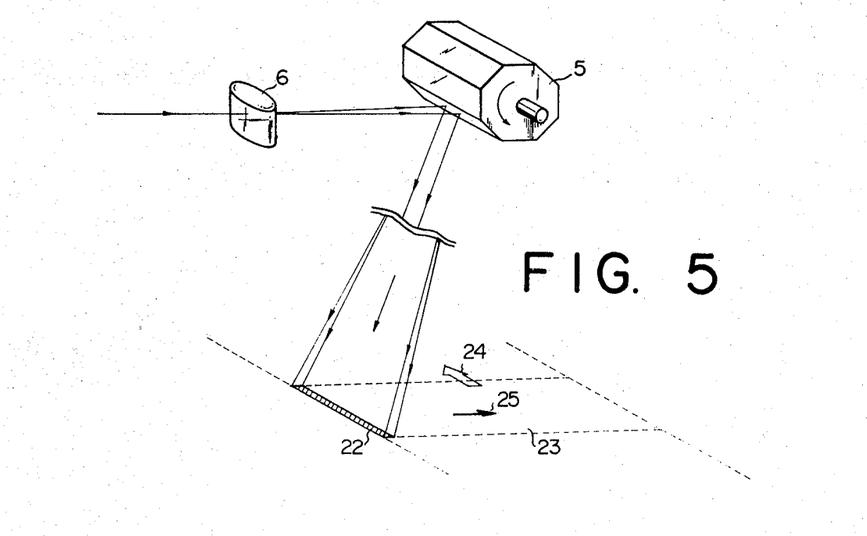
FIGS. 5 to 8 are respectively perspective views of the main parts of the embodiment of FIG. 2.

FIG. 5 shows the optical system 6 and scanning device 5 according to an embodiment of the present invention. The scanning device 5 is a rotating member assuming an angular columnar form, the side wall of which constitutes a reflector. Since there are defined varying angles of reflection with respect to the side wall of said rotating scanning device 5 as it turns round, the ground surface 23 is scanned in a direction 25 perpendicular to that 24 in which an airplane travels. Beams of light reflected from the ground surface 23 are received by a second optical system 7 of FIG. 2 to produce the image of that part of the ground surface 23 falling within the radiated line are 22 of radiation shown in FIG. 5 on the light-receiving surface 8 of an image intensifying tube 9.

Figure 6:
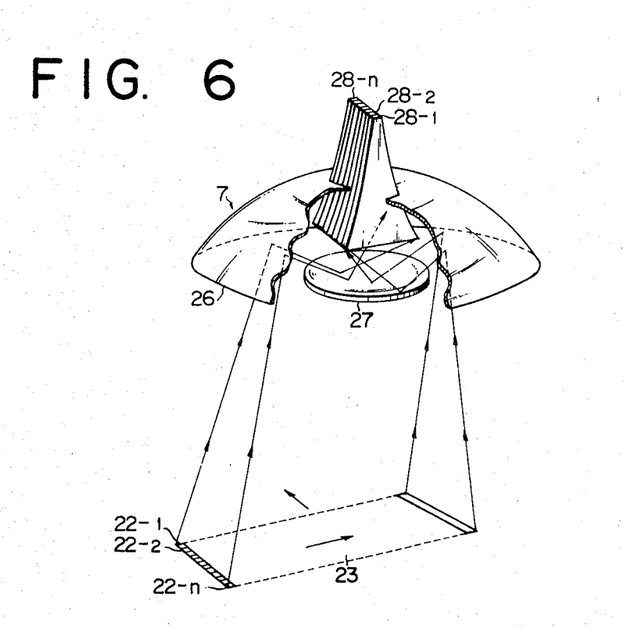

As illustrated in FIG. 6, said optical system 7 consists of, for example, a concave member 26 assuming a spherical form on the inside, a reflector 27 assuming a a glass plate stack 28 ((28–1), 28–2), . . . (28–$n$)). The glass plate stack is formed of a plurality of glass plates juxtaposed in an optically separated relationship and in the direction of the expansion of that light from the reflector 27 which is responsive to the radiated line area 22 on the ground 23. Each of the glass plates is broad at one end on the side of the reflector 27 in the direction perpendicular to the expansion of the reflected light and narrow at the other end so as to concentrate the light on a straight line. Said optical system 7 always allows the light reflected from the ground surface 23 to be focused on the specified part of said light receiving surface 8 regardless of the scanning angle $2\theta$ of the linearly radiated laser light, though the radiated area 22 shifts as the ground surface is scanned.

Figure 7:
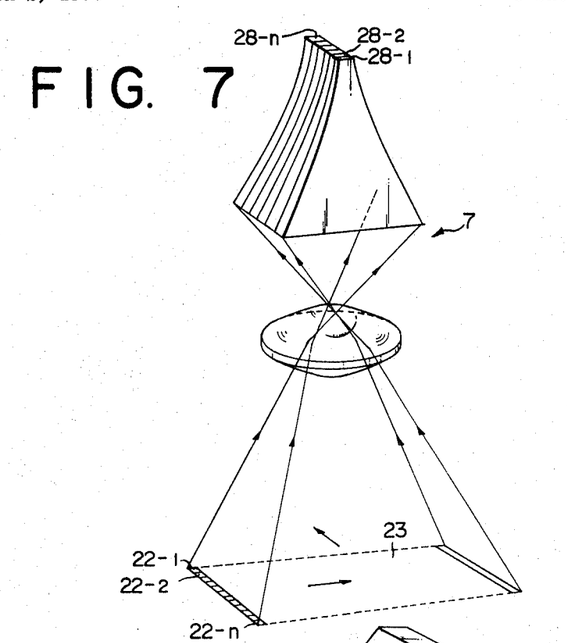
Figure 8:
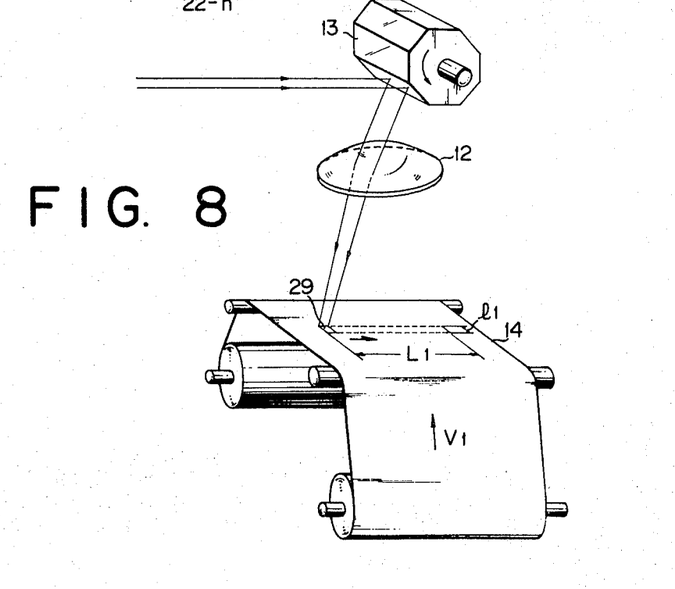

FIG. 7 shows a modification of the optical system 7 of FIG. 6, including a convex lens. Said image intensifying tube 9 is provided with a source of power 10 which is connected to the first pulse generator 1 in such a manner that it delays output pulses therefrom by a period of time $t_1$ slightly shorter than the time 2 Hmin./$C_L$ which the laser light takes in traveling both ways through the minimum radiating range Hmin. of the present system and actuates the image intensifying tube 9 only for a length of time $t_2$ including 2 Hmax./$C_L$. The wave form of output voltage from said power source 10 is shown in FIG. 3D. The image of the radiated area 22 of the ground surface 23 appearing on the output fluorescent surface 11 of said image intensifying tube 9 is recorded, as shown in FIG. 8, on a film 14 in the form of a linear image 29 in accordance with the intensity of the reflected light through a third optical system 12. Outputs of laser light from said image intensifying tube 9 are deflected in a direction perpendicular to the plane of said linear image 28 by a second scanning device 13 synchronizing with said first scanning device 5, the scanning angle of the former being proportionate to that of the latter. Said film 14 is wound by a film winding device 15 in a direction of the linear image 29.

There will now be described the operation and effect of an image pickup system according to the present invention when it is put to practical use in an airplane.

Figure 4A:
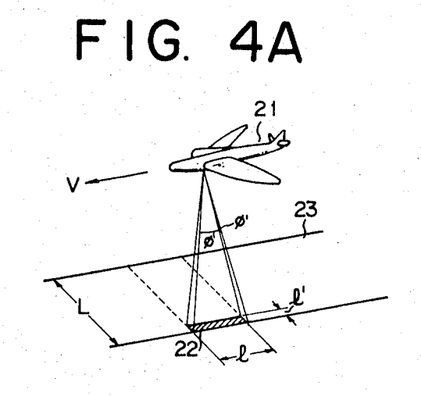
FIGS. 4A and 4B are schematic illustrations of the system of the invention.
Figure 4B:
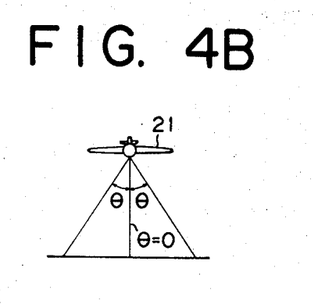

Referring to FIG. 4A, the width $l$ of the radiated line area 22 in the direction in which an airplane 21 travels is set at $2H \tan \phi/2$ by its height H from the ground surface 23 and the expanding angle $\phi$ of linearly radiated laser light in the direction in which the airplane 21 advances. Further, the width $l'$ of the radiated line area 22 in a direction perpendicular to that in which the airplane 21 flies is defined at $H\phi'/\cos^2 \theta$ by three factors, that is, the expanding angle $\phi'$ of linearly radiated laser light in a direction perpendicular to the movement of the airplane 21, scanning angle $2\theta$ and the height H of the airplane 21 from the ground surface 23. Accordingly, where the image pickup system of the present invention is operated with the speed of the airplane 21 designated as V and the repetitive period $t_0$ of pulse laser light set at $l/NV$, then the ground surface 23 is scanned by linearly radiated pulse laser light in both directions perpendicular and parallel to that in which the airplane 21 travels as the airplane 21 flies. Namely, as the airplane 21 advances, there are radiated in succession the areas of the ground surface 23 included in the width $L=2H \tan N\phi'/2$ in a direction perpendicular to that in which the airplane flies. Each time the ground surface 23 is radiated by pulse laser light, there is recorded information thereon on said film 14. As shown in FIG. 8, the length of the recorded line image 29 is expressed as $l_1$. Now let it be assumed that said film 14 is wound about film winding device 15 at the rate of $V' \doteqdot Vl_1/l$ and the second scanning device scans said film 14 with a width of $$L_1 = 2\frac{l_1}{l}L$$

When an airplane 21 continues its flight with an image pickup system operated under such condition, then the two-dimensional image of that area of the ground surface 23 included in said width L of scanning and extending in the direction of the airplane's flight is recorded on said film 14 in a similar form. Since, in this case, the light receiving surface 8 of said image intensifying tube 9 is only required to be large enough to produce an image corresponding to the radiated area 22 ($l \times l'$), the image pickup system of the present invention is made more compact than the prior art device wherein said light receiving surface 8 was required to have a sufficient size to obtain an image corresponding to the width L, and is more adapted to be installed in an airplane. Further, the angle resolving power of the present system can be improved by reducing the expanding angle $\phi'$ of linearly radiated laser light.

Figure 9:
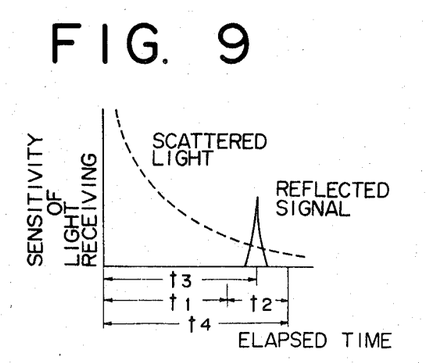
FIG. 9 is a showing of the relationship of length of time after radiation of a laser light versus the sensitivity of receiving said light.

The light receiving surface 8 of said image intensifying tube 9 receives light scattered backward by space particles such as fine drops of mist suspended in the atmosphere with a sensitivity which varies in inverse proportion to the length of time after generation of output laser pulses as shown by a dotted line in FIG. 9, and signals reflected from the ground surface 23 in a length of time $t_3$ corresponding to the radiating range $2H/C^L$ to the ground surface 23 as shown by a solid line in FIG. 9. If all these incoming lights are intensified by said image intensifying tube 9 then there will be recorded a considerably indistinct image. Therefore, it is necessary to separate signals reflected from the ground surface 23 from such scattered light. The prior art image pickup system using continuously oscillated light failed to distinguish reflected signals from such scattered light. The present invention is intended to intensify reflected light only approximately at the end of the time $t_3$ required in receiving said reflected light in synchronization with the repetitive period $t_0$ of pulse laser light, thereby distinctly producing only signals reflected from the ground surface 23 on the light receiving surface 11 of said image intensifying tube 9. According to the present invention, said image intensifying tube 9 is pulsatively actuated, as illustrated in FIG. 3D, after there elapses from the time of radiating the pulse laser light the time $t_1$ required for light signals to be reflected through a minimum radiating range Hmin. and only for a period $t_2$ substantially corresponding to the difference between the time $t_1$ and the time $t_4$ required for said signals to be brought back through a maximum radiating range Hmax. (the value of said period $t_2$ is determined in advance by separate means), thereby preventing light scattered backward by fine particles suspended in the atmosphere from being intensified and enabling a good image to be recorded on said film 14.

Figure 10:
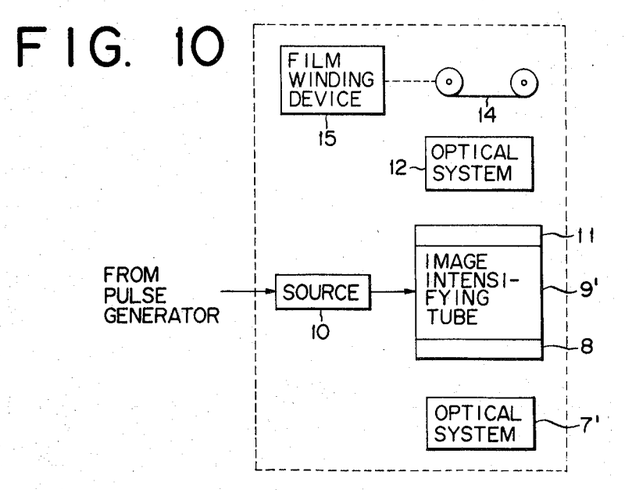
FIG. 10 is a block diagram of a modification of FIG 2.

There is now described by reference to FIG. 10 a modification of the embodiment of FIG. 2. This modification involves an image intensifying tube 9', whose light receiving surface 8 produces the images of the parts of the ground surface 23 included not only in the radiated area 22 but also in an area defined by the width $l$ parallel to the airplane's flight and the width L perpendicular thereto. Use of said image intensifying tube 9' permits the omission of said second scanniing device 13 and the glass plate stack 28 is not required in an optical system 7'.

There will now be described by reference to FIG. 11 another modification of FIG. 2. The same parts of FIG. 11 as those of FIG. 2 are denoted by the same numerals and description thereof is omitted. Photoelectric converting elements 39 ((39–1), (39–2), . . . (39–$n$)) are juxtaposed in a straight line in a number $n$ approximately equal to the ratio $\phi/\phi'$ of the expanding angles of linear laser light and in a state electrically disconnected from each other. Light reflected from the different parts (22–1), (22–2), . . . (22–$n$), shown in FIG. 6, of that radiated line area 22 of the radiated ground surface 23 is focused, on the light receiving surfaces of said juxtaposed photoelectric converting elements 39 ((39–1), (39–2), . . . (39–$n$)) regardless of the scanning angle of linearly radiated laser light due to the action of glass plate stacks 28 ((28–1), (28–2), . . . (28–$n$)) involved in the optical system 7. The power source 10 generates output voltage only for a period $t_2$ shown in FIG. 3D, namely, for a length of time, as previously described, equal to the period during which a reflected signal is received in the optical system 7, thereby actuating amplifiers (40–1, (40–2), . . . (40–$n$) connected to said photoelectric converting elements 39 ((39–1), (39–2), . . . (39–$n$)). The wave form of output signals from said group of amplifiers is illustrated in FIG. 3D. Said output signals are supplied to illuminators 43 (43–1), (43–2), . . . (43–$n$)) juxtaposed in a straight line which exhibit brightness proportionate to said output signals of the amplifiers 40. The light is recorded on the film 14 through the third optical system 12. The embodiment of FIG. 11 displays the same effect as that of FIG. 2.

Figures 3E, 3F:
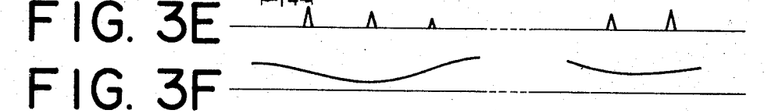
Figure 3G:
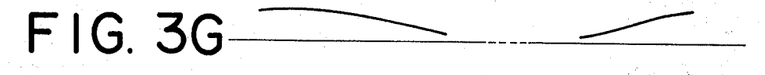

There will now be described by reference to FIG. 12 another embodiment of the present invention. The same parts of FIG. 12 as those of FIGS. 2 and 11 are denoted by the same numerals and description thereof is omitted. The embodiment of FIG. 12 is particularly intended to obtain information on the undulating condition of the ground surface. Amplifiers 50 ((50–1), (50–2), . . . (50–$n$)) amplify output signals from said group of photoelectric converting elements only for the previosuly set period $t_2$ each time a series of signals are reflected from the ground surface to the image pickup system, the wave form of output signals from said amplifiers 50 being indicated in FIG. 3E. The extent of undulations on the ground surface as informed by laser light is determined by range finders 51 ((51–1), (51–2), . . . (51–$n$)) connected to said amplifiers (50–1), (50–2), . . . (50–$n$)) respectively. Each of said range finders 51 has a counter for measuring the interval between the time it receives output pulses from said first pulse generator 1 and the time it is supplied with output pulses from said amplifiers 50 which are indicated in FIG. 3E, namely, the distance between the airplane and ground surface, thereby generating an output voltage corresponding to said distance. To each of said range finders 51 are connected correctors 52 ((52–1), (52–2), . . . (52–$n$)) respectively which correct the outtput voltage generated by said range finders 51 in such a manner that no matter how the scanning angle $\theta$ varies, the same height thereon is always indicated by an equal output voltage. Namely, where the ground surface is entirely plain, said correctors 52 fix the output voltage of said range finders 51, regardless of said scanning angle $\theta$ and the output voltage of said photoelectric converting elements 39. Output signals from said correctors 52 are supplied to illuminators 53 ((53–1), (53–2), . . . (53–$n$)), causing them to send forth light having brightness corresponding to said output signals. The optical system 62, scanning device 63, film 64, film winding device 65 involved in the embodiment of FIG. 12 are of the same type as those of FIG. 11.

Figure 13:
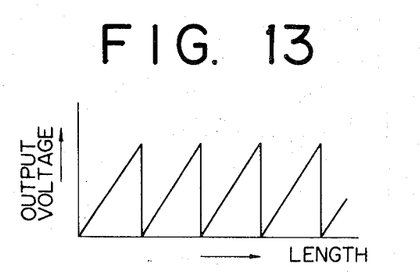
FIG. 13 shows the wave form of the output voltage used in the range finder of FIG. 12.

If said range finders 51 are of such type as generates ranging output voltages having a saw-toothed wave form illustrated in FIG. 13, there may be presented on the film 18 the same light and dark pattern for each distance falling within a certain limit. However, as the distance increases, the output voltage will tend to raise more prominently, allowing even small undulations on the ground surface to be exhibited in distinct contrast, namely, the amount of information to be appreciably increased. Therefore, this system is directed to the special object for which the image pickup system is used.

Figure 11:
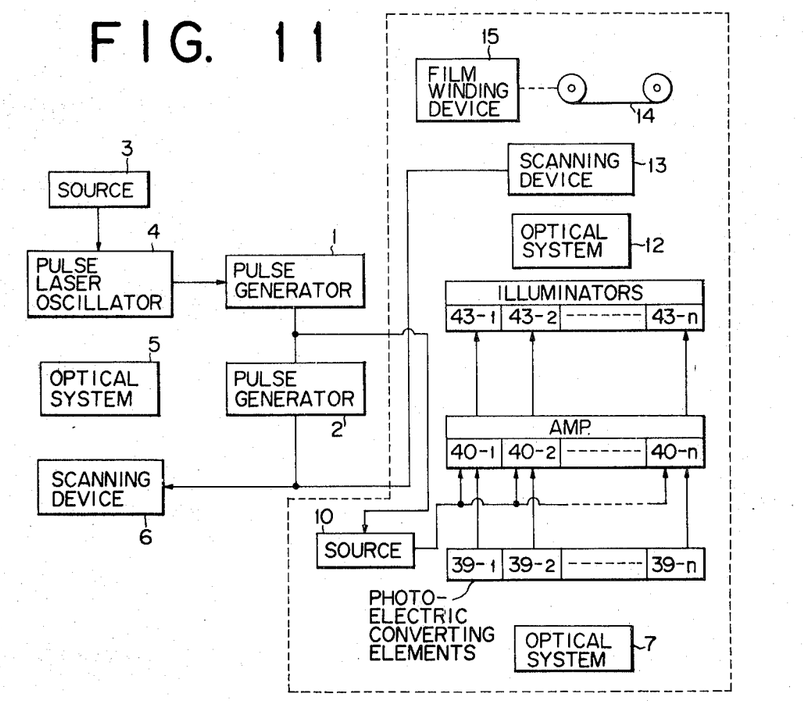
FIG. 11 is a block diagram of another embodiment of the image pickup system of FIG. 2.
Figure 12:
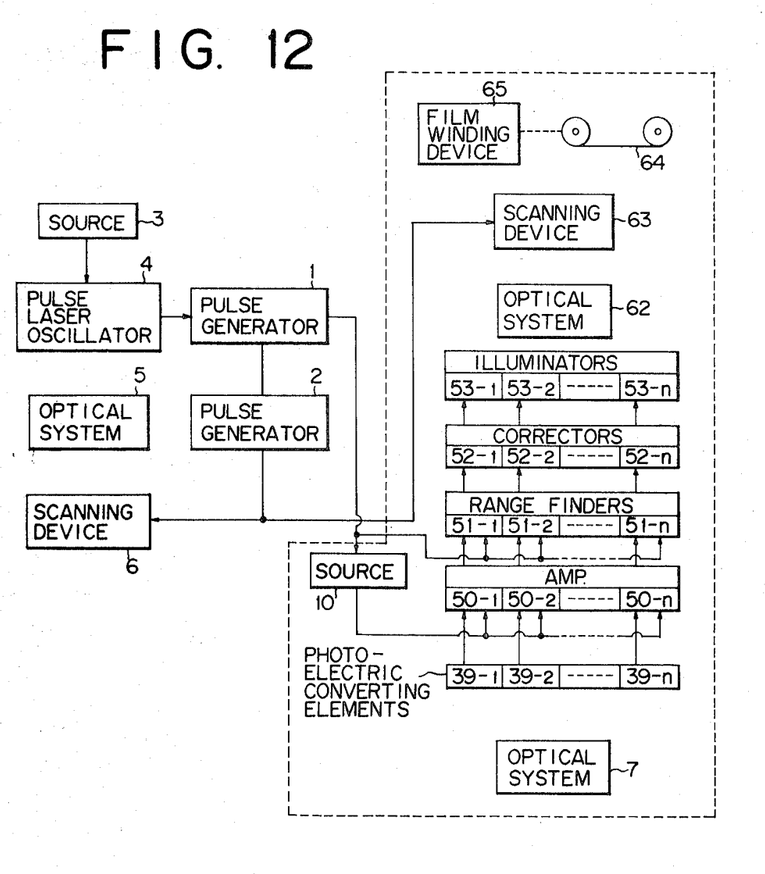
FIG. 12 is a block diagram of means according to an embodiment of the invention for obtaining information on the three-dimensional condition of a foreground object.

The operation and effect of the system shown in FIG. 12 are substantially similar to those hown in FIG. 11, so the detailed description thereof is omitted. The system in FIG. 12 is different from that in FIG. 11 only in the point that the illuminators 53 of FIG. 12 radiate light in response to the ranging signal from the range finder 51, while the illuminators 43 of FIG. 12 radiate light in accordance with the intensity of the reflected signal from the ground surface. Accordingly, there is obtained on the film 64 of the system in FIG. 12 information on undulations of the three-dimensional condition of the ground surface instead of two-dimensional image in the form of a distinct image using a compact system without any harmful effect of scattered space particles.

There will now be described by reference to FIG. 14 still another embodiment of the present invention which obtains information on both two- and three-dimensional conditions of the ground surface at the same time.

Figure 14:
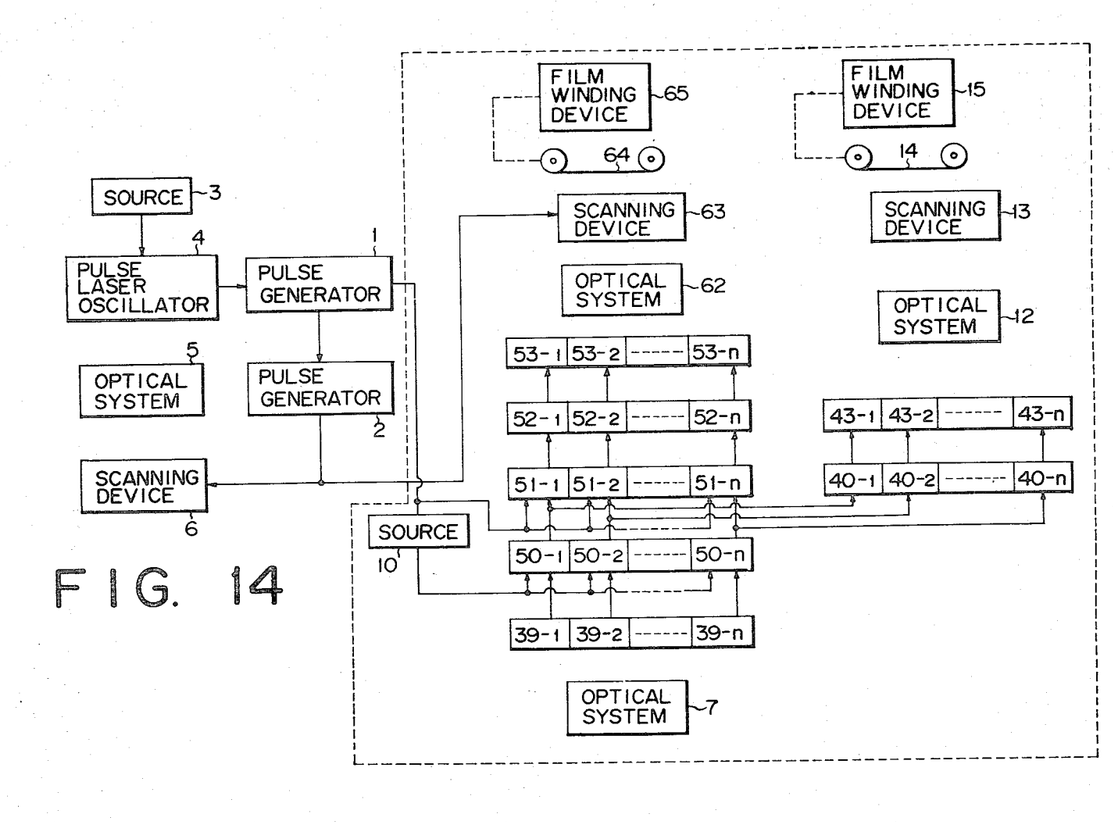
FIG. 14 is a block diagram of a system according to an embodiment of the invention for obtaining both the two-dimensional image of a foreground object and information on the three-dimensional condition thereof.

The embodiment of FIG. 14 is a combination of a system shown in FIG. 11 for indicating information on the two-dimensional condition of the ground surface and a system illustrated in FIG. 12 for obtaining information on the three-dimensional condition of the ground surface. The same parts of FIG. 14 as those of FIGS. 11 and 12 are denoted by the same numerals and description thereof is omitted. The two systems are combined by connecting the input terminals of the amplifiers 40 of the system of FIG. 11 for giving information on the two-dimensional condition of the ground surface to the output terminals of the amplifiers 50 for amplifying output signals from the photoelectric converting elements of the system of FIG. 12 for showing information on the three-dimensional condition of the ground surface. The embodiment of FIG. 14 also displays all information on both the two- and three-dimensional conditions of the ground surface.

If the pulse laser light used in the image pickup system of the present invention consists of, for example, Q switch laser, then the time width of pulses will be greatly reduced to about $10^{-8}$ seconds, thus enabling blurs of an image resulting from the high speed of an airplane to be minimized to a negligible extent.

The foregoing embodiments relate to the case where the actual condition of the ground surface is recorded as it is on the film, but electric signals may be recorded thereon in substitution for the image of the ground surface. Further, it will be apparent that the image pickup system of the present invention is adapted for use not only in a movable body like an airplane but also in a stationary body.

As mentioned above, the present invention enables information on both the two- and three-dimensional conditions of the ground surface to be obtained over a broad range with a compact apparatus due to the employment of linearly radiated laser light for transverse scanning and without any harmful effect of scattered space particules due to the use of linear laser light in a pulse form.

What we claim is:

1. A laser-type image pickup system for detecting an object which is moving relative to the image pickup system comprising:
    a source of laser light;
    means coupled to said source for oscillating said laser light and for forming oscillated pulse laser light;
    means coupled to said oscillating means for forming said oscillated pulse laser light in a generally rectangular pattern having two longitudinal sides and a width between said sides in the direction perpendicular to the direction of relative movement, thereby forming a linearly radiated pulse laser light, said means for forming the linearly radiated pulse laser light including a first optical system for receiving and converting said pulse laser light to a flux expanding at a prescribed angle in the direction of its movement and also expanding in a direction perpendicular thereto at an angle which is narrower than the first mentioned angle of expansion so as to permit a prescribed angle resolving power;
    means for directing said formed laser light pattern toward an object and for scanning said object by said formed laser light pattern in a direction perpendicular to the longitudinal sides of said formed laser light pattern; and
    means for receiving a laser light reflected from said object and for generating information which is a function of the physical condition of said scanned object, said receiving means including a second optical system for receiving and focusing said linearly radiated pulse laser light reflected from said object in the form of a straight line which corresponds to the radiated area of said object regardless of the angle of scanning, said second optical system having a concave member spherical on the inside for receiving and concentrating light reflected from said object, a reflector facing said concave member for receiving beams of light reflected therefrom, and a glass plate stack including a plurality of glass plates juxtaposed in an optically separated relationship, each plate being broad at one end and narrow at the other in a direction perpendicular to that in which beams of light corresponding to the radiated area of said object are reflected from said reflector, thereby linearly concentrating beams of light reflected from the radiated area of said object on said narrow end regardless of the scanning angle of the laser light.

2. A system according to claim 1 adapted to be installed in movable body wherein said longitudinal sides of said linearly radiated laser light extend in the direction in which said movable body travels, said scanning means scanning said object in a direction perpendicular to the direction of movement of said movable body.

3. A system according to claim 1 wherein:
    said means for forming said oscillated pulse laser light comprises a first pulse generator for generating first pulses having a repetitive period longer than that required for a pulse laser light to travel through a maximum radiating range, a laser light oscillator for oscillating said laser light from said source, the output of said oscillator being coupled to said first pulse generator for generating oscillated pulse laser light in synchronization with said first pulses; and
    said scanning means comprises a second pulse generator for generating one pulse in synchronization with a predetermined number of said first pulses generated by said first pulse generator, and a scanning device responsive to output pulses from said second pulse generator for scanning said object by said linearly radiated pulse laser light through a prescribed angle of scanning.

4. A system according to claim 3 wherein said receiving and information generating means comprises means responsive to the intensity of said linearly radiated laser light reflected from said object for producing an image corresponding to the two-dimensional condition of said object.

5. A system according to claim 4 wherein said means for producing the image corresponding to the two-dimensional condition of said object comprises an image intensifying tube receiving light from said second optical system for intensifying the image of the radiated area of said object formed on said light receiving surface from output light from said second optical system, a power source for said image intensifying tube and operating in synchronization with said first pulses from said first pulse generator for actuating said image intensifying tube only when there is received a linearly radiated pulse laser light reflected from said object to substantially eliminate effects of light scattered by space particles, a second scanning device connected to said first scanning device for deflecting output light from the output surface of said image intensifying tube corresponding to the radiated area of said object in synchronization with its scanning, and a recording medium for recording an image corresponding to the two-dimensional condition of said object responsive output beams of light from said image intensifying tube 6. A system according to claim 5 wherein said power source generates an output pulse after there elapses from the time of radiating the pulse laser light to the object, the time $t_1$ required for light signals to be reflected through a minimum radiating range, and for a period corresponding to the difference between the time $t_1$ and the time $t_4$ required for said signals to be brought back through a maximum radiating range, said power source output pulse being in synchronization with the radiation of the pulse laser and actuating said image intensifying tube.

7. A system according to claim 4 wherein said means for producing the image corresponding to the two-dimensional condition of said object comprises, an image intensifying tube receiving light from said second optical system for intensifying the image corresponding to the two-dimensional condition of said object formed on the light receiving surface of said tube from output beams of light from said second optical system, a power source for said image intensifying tube and operating in synchronization said first pulses from said first pulse generator for actuating said image intensifying tube only when there is received a linearly radiated pulse laser light reflected from the radiated area of said object to substantially eliminate effects of light scattered by space particles, and a recording medium for recording an image corresponding to the two-dimensional condition of said object responsive to output light from said image intensifying tube.

8. A system according to claim 4 wherein said means for producing the image corresponding to the two-dimensional condition of said object comprises a group of photoelectric converting elements juxtaposed in a straight line for converting output beams of light received from said second optical system to electrical signals, a group of first amplifiers connected to respective photoelectric converting elements, a power source for said group of amplifiers and operating in synchronization with first pulses from said first pulse generator for actuating said group of amplifiers only when there is received a linearly radiated pulse laser light reflected from said object to substantially eliminate effects of light scattered by space particles, a group of first illuminators connected to respective first amplifiers for generating light as a function of the respective amplifiers, a second scanning device connected to said first scanning device for deflecting output beams of light from said group of first illuminators which beams of light correspond to the radiated area of said object, said deflector being in synchronization with the scanning of said object by said linearly radiated pulse laser light, and a first recording medium for recording the image corresponding to the two-dimensional condition of said responsive to output beams of light from said group of illuminators.

9. A system according to claim 1 adapted to be installed in an airplane, or the like, wherein said longitudinal sides of said linearly radiated laser light extend in the direction in which said airplane travels, said scanning means scanning the ground in a direction perpendicular to the direction of movement as said airplane.

10. A system according to claim 3 wherein said receiving and information generating means includes means for generating information corresponding to the three-dimensional condition of said object by detecting the times required for said linearly radiated pulse laser light to travel both ways through the distance between said image pickup system and said object.

11. A system according to claim 10 wherein said means for generating information corresponding to the three-dimensional condition of said object comprises a group of photoelectric converting elements juxtaposed in a straight line for converting output beams of light from said second optical system to electrical signals, a group of second amplifiers respectively connected to said photoelectric converting element, a power source for said group of amplifiers and operating in synchronization with said first pulses from said first pulse generator for actuating said group of second amplifiers only when there is received a linearly radiated pulse laser light reflected from said object to substantially eliminate effects of light scattered by space particles, a group of range finders connected to said first pulse generator and respectively connected to said group of second amplifiers for detecting and generating signals corresponding to the time interval between the time said linear laser light is radiated to said object and the time it is reflected therefrom to thereby detect the distance between said image pickup system and said range finders for correcting output signals from said range finders, a group of second illuminators respectively connected to said correctors for generating light outputs responsive to respective output signals from said group of correctors, a third scanning means connected to said first scanning means for deflecting output beams of a linearly radiated laser light from said group of illuminators which correspond to the radiated area of said object in synchronization with said scanning of said object, and a second recording medium responsive to said third scanning means for recording information corresponding to the three-dimensional condition of said object.

12. A system according to claim 3 wherein said receiving and information generating means comprises:
means responsive to the intensity of said linearly radiated laser light reflected from said foreground object after its scanning for producing an image corresponding to the two-dimensional condition of said object, and means for determining the times required for said laser light to travel both ways through the distance between said image pickup system and said object for producing information corresponding to the three-dimensional condition of said object.

13. A system according to claim 12 wherein said means for producing said two-dimensional image and three-dimensional information comprises a group of photoelectric converting elements juxtaposed in a straight line for converting output beams of light from said second optical system to electrical signals, a group of second amplifiers connected respectively to said photoelectric converting elements, a power source for said group of second amplifiers and operating in synchronization with said first pulses from said first pulse generator for actuating said group of second amplifiers only when there is received a linearly radiated pulse laser light reflected from said object to substantially eliminate effects of light scattered by space particles, a group of range finders connected to said first pulse generator and respectively connected to said group of second amplifiers for detecting and generating signals corresponding to the time interval between the time said linear laser light is radiated to said object and the time it is reflected therefrom to thereby detect the distance between said image pickup system and said object, a group of correctors respectively connected to said range finders for correcting output signals from said range finders, a group of second illuminators respectively connected to said correctors for generating light outputs responsive to output signals from said group of correctors, a third scanning means connected to said first scanning means for deflecting output beams of a linearly radiated laser light from said group of second illuminators which correspond to the radiated area of said object in synchronization with said scanning of said object a second recording medium responsive to said third scanning means for recording information corresponding to the three-dimensional condition of said object, a group of first amplifiers connected respectively to said group of second amplifiers, a group of first illuminators connected respectively to said first amplifiers for generating light outputs responsive to respective outputs of said first amplifiers, a second scanning means connected to said first scanning means for deflecting output beams of light from said group of first illuminators which correspond to the radiated area of said object in synchronization with the scanning of said object by said linearly radiated pulse laser light, and a first recording medium responsive to output beams of light from said group of first illuminators for recording the image corresponding to the two-dimensional condition of said object.

References Cited

UNITED STATES PATENTS

| | | | |
|---|---|---|---|
| 2,967,211 | 1/1961 | Blackstone et al. | 178—6.7 R |
| 3,527,533 | 9/1970 | Hook et al. | 346—76 L |
| 3,278,746 | 10/1966 | Fiat | 346—108 |
| 3,305,633 | 2/1967 | Chernoch | 178—6.7 |
| 3,316,348 | 4/1967 | Hufnagel et al. | 178—6.7 |
| 3,511,927 | 5/1970 | Lehr | 178—6.7 |
| 3,523,730 | 8/1970 | Hayek et al. | 346—76 L |

JAMES W. MOFFITT, Primary Examiner

U.S. Cl. X.R.

346—108; 178—6.6 R